US011283890B2

(12) United States Patent
Benedetto

(10) Patent No.: US 11,283,890 B2
(45) Date of Patent: Mar. 22, 2022

(54) POST-ENGAGEMENT METADATA GENERATION

(71) Applicant: Sony Interactive Entertainment LLC, San Mateo, CA (US)

(72) Inventor: Warren Benedetto, Aliso Viejo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/821,825

(22) Filed: Mar. 17, 2020

(65) Prior Publication Data
US 2020/0336557 A1    Oct. 22, 2020

Related U.S. Application Data

(63) Continuation of application No. 15/456,197, filed on Mar. 10, 2017, now Pat. No. 10,594,812.

(51) Int. Cl.
*H04L 29/08* (2006.01)
*H04L 67/50* (2022.01)
*H04L 67/52* (2022.01)
*H04W 4/02* (2018.01)
*H04W 4/38* (2018.01)

(52) U.S. Cl.
CPC .............. *H04L 67/22* (2013.01); *H04L 67/18* (2013.01); *H04W 4/02* (2013.01); *H04W 4/38* (2018.02)

(58) Field of Classification Search
CPC .......... H04L 67/22; H04L 67/18; H04W 4/38; H04W 4/02
See application file for complete search history.

(56) References Cited

U.S. PATENT DOCUMENTS

| 7,865,592 B2 | 1/2011 | Chakra et al. |
| 10,594,812 B2 | 3/2020 | Benedetto |
| 2008/0070697 A1 | 3/2008 | Robinson et al. |

(Continued)

FOREIGN PATENT DOCUMENTS

| CN | 110603753 | 12/2019 |
| EP | 3 593 472 | 1/2020 |
| WO | WO 2018/165526 | 9/2018 |

OTHER PUBLICATIONS

PCT Application No. PCT/US2018/021702 International Search Report and Written Opinion dated May 18, 2018.

(Continued)

*Primary Examiner* — Benjamin M Thieu
(74) *Attorney, Agent, or Firm* — Polsinelli LLP

(57) ABSTRACT

An apparatus for generating post-engagement metadata includes at least one sensor for recording sensor data at a first location, a network interface, a memory, and a processor. The processor is connected to the sensor, the network interface, and the memory and is configured to monitor for termination of engagement with the apparatus by a first user. The processor records a last engagement activity before the termination of engagement, and determines post-engagement user actions by the first user based on sensor data from the at least one sensor, after the termination of engagement. The processor determines a termination cause, based on the post-engagement user actions, and generates post-engagement metadata for the first user including the termination cause.

21 Claims, 7 Drawing Sheets

(56) References Cited

U.S. PATENT DOCUMENTS

| | | |
|---|---|---|
| 2009/0083631 A1 | 3/2009 | Sidi et al. |
| 2011/0069940 A1 | 3/2011 | Shimy |
| 2012/0209961 A1* | 8/2012 | McCoy .............. H04N 21/4436 709/219 |
| 2012/0222065 A1 | 8/2012 | Prins et al. |
| 2012/0253920 A1 | 10/2012 | Yarvis et al. |
| 2013/0159861 A1* | 6/2013 | Rottler .................... G06F 3/167 715/727 |
| 2014/0201767 A1 | 7/2014 | Seiden |
| 2014/0280962 A1 | 9/2014 | Schultz |
| 2016/0366203 A1 | 12/2016 | Blong et al. |
| 2017/0024798 A1 | 1/2017 | Richards et al. |
| 2018/0014077 A1* | 1/2018 | Hou ................. H04N 21/26233 |
| 2018/0219691 A1* | 8/2018 | Calcaterra ............... H04L 67/22 |
| 2018/0262582 A1 | 9/2018 | Benedetto |

OTHER PUBLICATIONS

U.S. Appl. No. 15/456,197 Office Action dated May 2, 2019.
European Application No. 18763126.2 Extended European Search Report dated Oct. 21, 2020.
PCT Application No. PCT/US2018/021702 International Preliminary Report on Patentability dated Sep. 10, 2019.

* cited by examiner

POST-ENGAGEMENT METADATA GENERATION

CROSS-REFERENCE TO RELATED APPLICATION

The present application is a continuation and claims the priority benefit of U.S. patent application Ser. No. 15/456,197 filed Mar. 10, 2017, which is incorporated herein by reference in its entirety.

BACKGROUND OF THE INVENTION

Field of the Invention

This application relates to multimedia devices, and more particularly to a system and method for generating post-engagement metadata.

Description of the Related Art

Digital content distribution systems conventionally include a content server, a content player, and a communications network connecting the content server to the content player. The content server is configured to store digital content files, which can be downloaded from the content server to the content player. Each digital content file corresponds to a specific identifying title. The digital content file typically includes sequential content data, organized according to playback chronology, and may comprise audio data, video data, or a combination thereof.

Digital content distribution systems generally include a content server, a content player, and a communications network connecting the content server to the content player. The content server is configured to store (or provide access to) media content made available to end users. Media content may include, movies, videos, music, games, social applications, etc. The content player is configured to download and play a digital content, in response to a user request selecting the title for playback. The user is typically presented with a set of recommended titles for selection. Such recommendations are based primarily on previous operations and/or selections performed by the user.

To improve the recommendations, content players typically track metadata for user activities as the user is engaged with media content. Metadata is defined as the data providing information about one or more aspects of the data. Metadata is used to summarize basic information about data which can allow for tracking and working with specific data.

SUMMARY OF THE PRESENTLY CLAIMED INVENTION

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later. In accordance with one or more aspects of the examples described herein, systems and methods are provided for generating post-engagement metadata.

In an aspect, an apparatus for generating post-engagement metadata includes at least one sensor for recording sensor data at a first location, a network interface, a memory, and a processor. The processor is connected to the sensor, the network interface, and the memory and is configured to monitor for termination of engagement with the apparatus by a first user. The processor records a last engagement activity before the termination of engagement, and post-engagement user actions by the first user based on sensor data from the at least one sensor, after the termination of engagement. The processor determines a termination cause, based on the post-engagement user actions, and generates post-engagement metadata for the first user including the termination cause.

In a second aspect, a method for generating post-engagement metadata by an entertainment system includes monitoring for termination of engagement with the entertainment system by a first user. The entertainment system records a last engagement activity before the termination of engagement, and post-engagement user actions by the first user based on sensor data from at least one sensor, after the termination of engagement. The entertainment system determines a termination cause, based on the post-engagement user actions, and generates post-engagement metadata for the first user comprising the termination cause.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for generating post-engagement metadata, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

A streaming media service generally includes a content server, a content player, and a communications network connecting the content server to the content player. The content server is configured to store (or provide access to) media content made available to end users. Media content may include, movies, videos, music, games, social applications, etc. The content player can suggest media content to one or more users based on the interests of the users. The content player can also suggest media content to be viewed or played together with other users connected online as a social experience. Such interests may be determined by the viewing or search history of the users.

The present disclosure provides technology that allows greater and more accurate metadata regarding user behavior in engaging with an entertainment device. To generate this post-engagement metadata, the entertainment device will record and analyze user behavior after the user has stopped watching a video, listening to a track, or playing a game.

Figure 1:
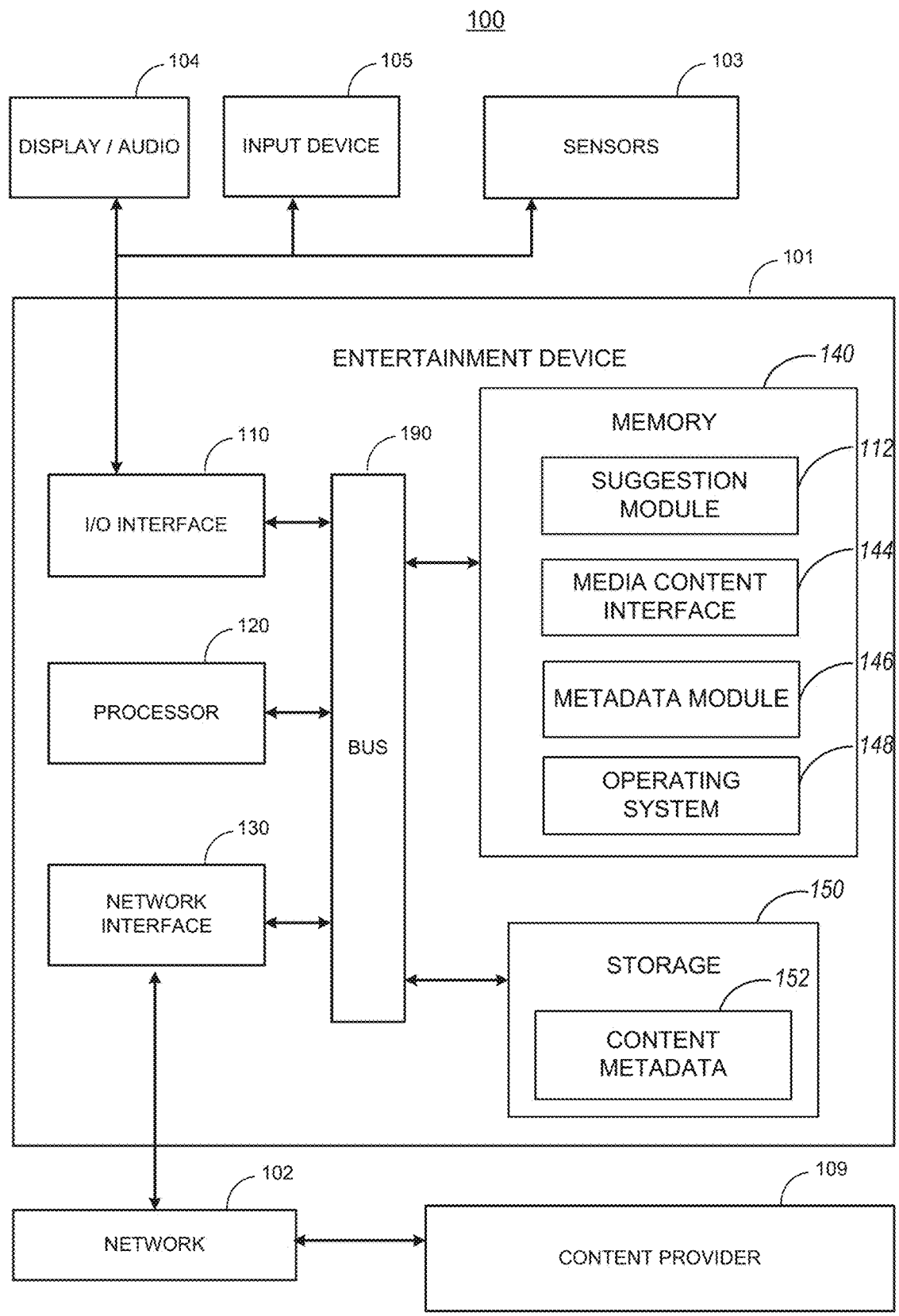
FIG. 1 illustrates a block diagram of an example entertainment device for generating post-engagement metadata.

FIG. 1 illustrates a block diagram 100 of an example entertainment device 101, according to one implementation of the invention. As shown, the entertainment device 101 includes, without limitation, an I/O interface 110 a processor 120, a network interface 130, a bus 190, a memory 140, and a storage 150. The bus 190 connects the I/O interface 110, the processor 120, the network interface 130, the memory 140, and the storage 150.

The I/O interface 110 connects I/O devices to the entertainment device 101. For example, I/O devices include input devices 105 such as a keyboard, mouse, or remote control. A user of the entertainment device 101 can use one of the input devices 105 to enter various commands.

Example display/audio devices 104 include a monitor, television, tablet, or smartphone with a liquid crystal display (LCD), light-emitting diode (LED), or organic light-emitting diode (OLED) panel, etc. The entertainment device 101 can output media content on the display/audio devices 104 for the user to enjoy.

The entertainment device 101 connects to a content provider 109 over the network 102. The network interface 150 is configured to transmit data to and from network 102, such as for example, to download media content from and/or transmit sensor data to the server system 105.

The processor 120 can include single central processing unit (CPU), multiple CPUs, a single CPU having multiple processing cores, etc. For example, the processor can 120 be a chip on a motherboard that can retrieve and execute programming instructions stored in the memory 140.

One or more sensors devices 103 are connected to or integrate into the entertainment device 101. The sensors 103 can include, for example, cameras, microphones, radars, Light Detection and Ranging (LIDAR) sensors, pressure sensors, wearable sensors, haptic sensors, or smart home appliances for detecting user location and/or activity. The sensors 101 provide various sensor data to the entertainment device 101.

The sensor data is interpreted by the entertainment device 101 and/or the content provider 109. Because the entertainment device 101 may have much lower processing power than the content provider 109, computationally intensive sensor data interpretation may occur at the content provider 109. In some implementations, the entertainment device 101 may perform rudimentary data interpretation locally, but send the sensor data for complex processing to the content provider 109 over the network 102.

For example, cameras can provide sensor data that allows the entertainment device 101 to determine a variety of information about users and their environment. In some implementations, one or more of various image processing and/or machine vision algorithms known in the art can be used to interpret the sensor data from the cameras. For example, the entertainment device 101 can determine from the sensor data how many users are in a room, if any, and their user identity. The entertainment device 101 can determine from the sensor data what activities one or more users in the room are engaged in, such as for example, resting on couch, eating a meal, in conversation, etc. In another example, the entertainment device 101 can determine from the sensor data facial expressions and moods of the users. For example, the entertainment device 101 can determine the mood of a user if the sensor data shows that the user is smiling, frowning, excited, bored, etc.

Audio sensors such as microphones can provide sensor data that allows the entertainment device 101 to determine a variety of information about users and their environment. One or more of various speech and sound processing algorithms known in the art can be used to interpret the sensor data from the microphones. For example, the entertainment device 101 can determine from the sensor data voice commands. The audio sensors can also allow the entertainment device 101 to passively receive sensor data for determining user preferences, behavior patterns, moods, schedules, etc. For example, the entertainment device 101 can determine the mood of a user based on voice tonality and/or positive (e.g., "I like this song") or negative (e.g., "what else is on TV?") speech. For example, the entertainment device 101 can determine the schedule of a user based on speech (e.g., "I have a doctor's appointment tomorrow morning at 8 am" or "I need to get to bed in an hour").

Wearable and haptic sensors can provide sensor data that allows the entertainment device 101 to determine user health and other body status information. For example, a smart watch can provide sensor data to the entertainment device 110 for heart rate of a user.

The sensors 103 may be integrated to the entertainment device 101 or can be external to the entertainment device. Sensors 103 located external to the entertainment device 101 are connected the entertainment device 101 via a wired cable or via a wireless connection such as WiFi or BLUETOOTH®.

The memory 140 can include any physical device used to temporarily or permanently store data or programs, such as various forms of random-access memory (RAM). The storage 150 may be a disk drive storage device. Although shown as a single unit, the storage 150 may be a combination of fixed and/or removable storage devices, such as magnetic disc drives, solid state drives (SSD), removable memory cards, optical storage, network attached storage (NAS), or a storage area-network (SAN). The storage 150 can include any physical device for non-volatile data storage such as a HDD or a flash drive. The storage 150 can often have greater capacity than the memory 140 and can be more economical per unit of storage, but can also have slower data transfer rates.

Storage 130, such as a hard disk drive or solid-state (SSD) storage drive, may store media content locally on the entertainment device such as files for an operating system, applications, games, videos, audio, user preferences, logs, and any other data.

The memory 140 stores data to be conveniently accessed by the processor 120 such as a suggestion module 112, a media content interface 144, a metadata module 146, and an operating system 148. The operating system 148 is system software that manages computer hardware and software resources and provides common services for computer programs.

The media content interface 144 is a software application that allows a user to access, browse, search, and play media content such as movies, videos, music, games, social applications, etc. The media content may be locally available on the storage 150 of the entertainment device 101 or be available over the network 102 (e.g., stored at a content provider or a peer entertainment device).

In some implementations, the media content interface 144 may permit a user to enter search queries for transmission to the content provider via the network 102. Content found and downloaded from the content provider or a peer entertainment device may be stored in storage 150 as buffered media content prior to being decoded and played by the media content interface 144.

The metadata module 146 is an application that generates metadata for users of the entertainment device 101. In some implementations, the metadata module 146 is also or alternatively included in the entertainment device 101. The metadata module 146 not only generates metadata when a user is engaging with the entertainment device 101, but also continues to generate metadata after the user stops engaging. The generated metadata can be stored in the storage 150 as content metadata 152.

For example, the metadata module 146 can generate metadata based on the user history. The metadata can include user/session data, including data relating to activities undertaken by various users of a number of entertainment devices 101, such as for example, which games were played, which videos were watched, and/or which music tracks were listened to, and a time and duration for each.

The metadata module 146 also generates metadata (i.e., post-engagement metadata) after the user stops engaging with the entertainment device 101. In some implementations, the metadata module 146 can monitor for when the user terminates engagement with the entertainment device 101 and record the last engagement activity. For example, the user may stop playing a first person shooter game on the entertainment device 101 after a streak of game losses. A record of the first person shooter game and the losing streak can be stored as post-engagement metadata related to the user.

In some implementations, the metadata module 146 determines post-engagement user actions using sensor data from at least one sensor. For example, post-engagement actions by the user can include going to bed, eating dinner, leaving the house to socialize, going to work, etc. The metadata module 146 then analyzes the sensor data to determine a termination cause, based on the post-engagement user actions. The metadata module 146 generates the post-engagement metadata which stores the termination cause.

The suggestion module 112 is an application that analyzes social interactions, the sensor data from the sensors 103, the user history, and the post-engagement metadata from the metadata module 146 to determine one or more suggested activities for encouraging continued user engagement with the entertainment device 101.

For example, a user may stop using the entertainment device 101 because the user's parents are asking the user to finish school work. The metadata module 146 may determine from sensor data from a microphone the cause of the user's termination of engagement with the entertainment device 101. The metadata module 146 stores the termination cause into the post-engagement metadata for the user. The suggestion module 112 may then suggest, either immediately or during a future occurrence of the termination cause, an educational tutorial video to the user to encourage continued engagement with the entertainment device 101.

In another example, a first user of the entertainment device 101 may speak to a second user that he is hungry, and then the first user and the second user stops engaging with the entertainment device 101. The metadata module 146 may determine from sensor data from a microphone the cause of the users' termination of engagement with the entertainment device 101. The metadata module 146 stores the termination cause into the post-engagement metadata for the user. The suggestion module 112 may then suggest, either immediately or during a future occurrence of the termination cause, food delivery services for use by the first user and the second user to encourage continued engagement with the entertainment device 101.

In a third example, a user of the entertainment device 101 may be bored with playing a video game alone. The metadata module 146 may determine from the user's social network messages, from after playing the game, that the user would like more social interactions with friends. The metadata module 146 stores the termination cause into the post-engagement metadata for the user. In some implementations, the suggestion module 112 may suggest engaging watching/playing the suggest media content with an online remote user connected over a network. For example, the online remote user can be an individual from a list of friends on a social network of one of the users of the entertainment device 101. The online remote user may be chosen based on similar interests and/or schedules.

Figure 2:
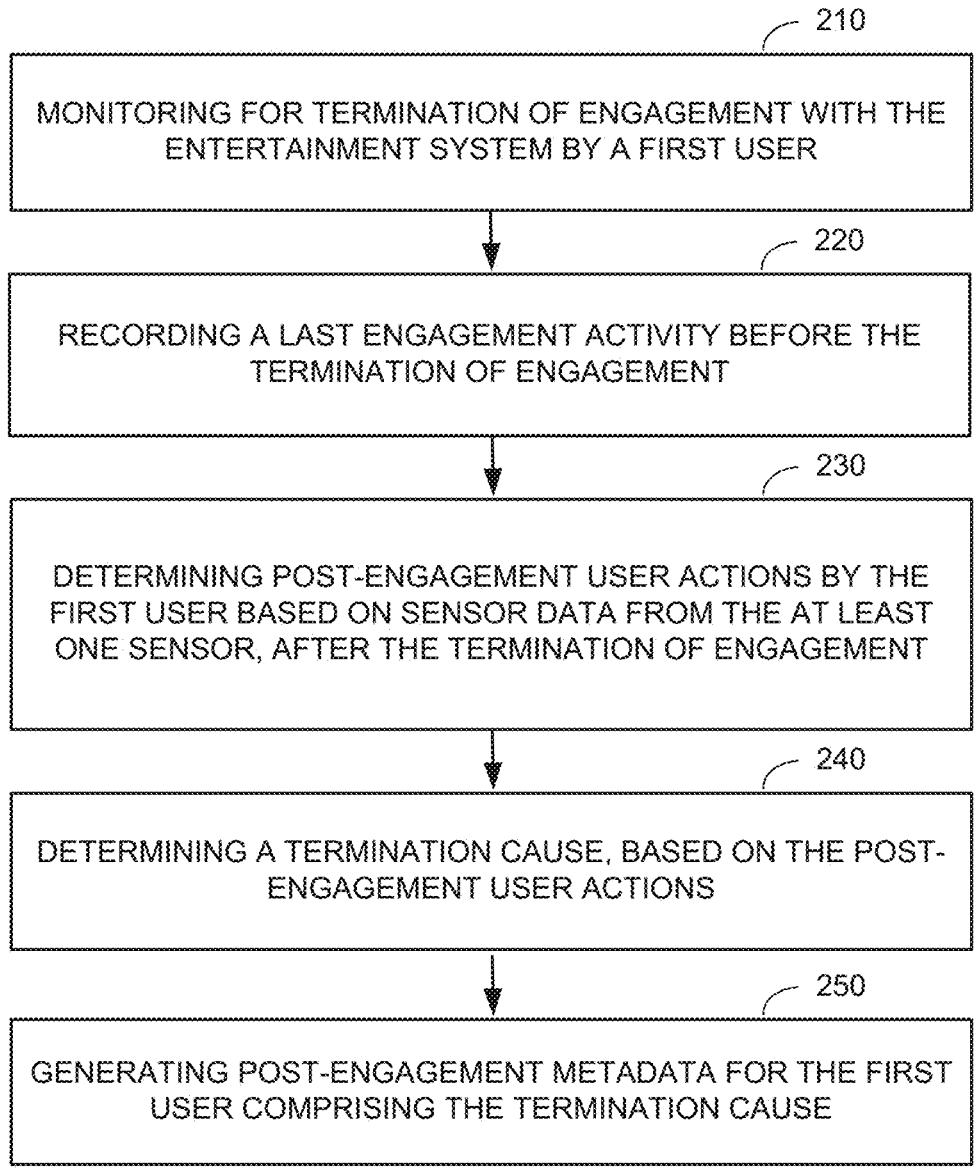
FIG. 2 illustrates an example methodology for generating post-engagement metadata.

FIG. 2 illustrates an example methodology 200 for generating post-engagement metadata by an entertainment device. At step 210, the entertainment device monitors for termination of engagement with the entertainment system by a first user.

At step 220, the entertainment device records a last engagement activity before the termination of engagement.

At step 230, the entertainment device determines post-engagement user actions by the first user based on sensor data from at least one sensor, after the termination of engagement. In some implementations, the post-engagement user actions are based on sensor data from a microphone for positive or negative voice reactions of the first user. The post-engagement user actions can be based on sensor data from communications a social networking application.

At step 240, the entertainment device determines a termination cause, based on the post-engagement user actions.

At step 250, the entertainment device generates post-engagement metadata for the first user comprising the termination cause.

In some implementations, the entertainment device detects for presence of at least one other user at a first location, determines availability data of physical resources for the first user and the at least one other user, where the physical resources include at least one of a display device, a console system, a set-top box, a mobile gaming device, or a tablet computer, and stores the availability data in the post-engagement metadata.

In some implementations, the entertainment device determines a physical resource distribution strategy based on the availability data, and outputs the physical resource distribution strategy on at least one connected display device or audio device.

In some implementations, the entertainment device determines a suggested action for continued engagement with the apparatus based post-engagement metadata, and outputs the suggested action on at least one connected display device or audio device.

In some implementations, the entertainment device locates a second user that is available on a remotely connected apparatus, where the second user shares a common engagement activity with the first user, and outputs a suggestion for the first user to connect to the second user to share the common engagement activity on at least one connected display device or audio device.

In some implementations, the entertainment device determines a schedule for the first user from at least one of an online social network, a personal calendar application, an electronic mail application, chat application, or text application of the first user, stores the schedule data in the post-engagement metadata.

In some implementations, the entertainment device monitors for voice cues in the sensor data, where the termination cause is further based on the voice cues.

Figure 3A:
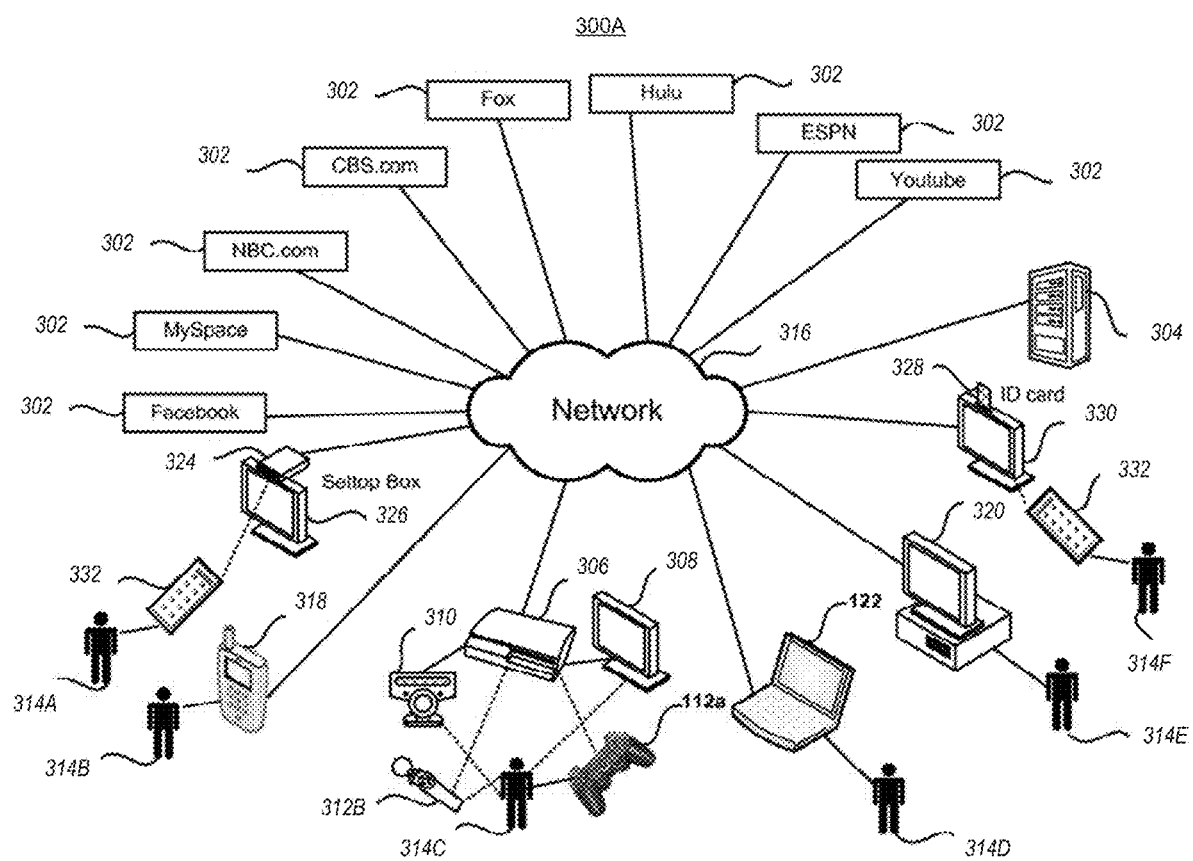
FIG. 3A illustrates a schematic diagram of an example infrastructure for generating post-engagement metadata.

FIG. 3A illustrates a schematic diagram of an example infrastructure 300A for generating post-engagement metadata. Media sources 302, distributed through network 316, can be of several types, such as Internet streamed media, broadcast media, on-demand media supplied by a cable company, photos posted on a social network, etc. A unique piece of downloaded media indented to be shown in its entirety to a user as a single unit is referred to herein as a media segment.

Different entertainment devices are available for receiving the media content and displaying the media to users 314 a-f. Example entertainment devices include set-top box 324 connected to a television display, mobile phone 318, game console 306, laptop 322, Personal Computer 320, television 330 configured with an ID card 328, etc. Additionally, users 314 a-f interact with the different entertainment devices in many ways, such as with remote control 332, voice commands, mobile-phone keys, camera 310 to capture user images in order to perform motion detection, game controllers 312 a-b, keyboard, etc.

A content provider 304 can be a server in communication with the entertainment devices to provide media content to the entertainment devices. For example, the media content can be a videos, games, software applications, music, photos, documents, presentations, billboards, coupons, videoconferences, etc. In one embodiment, media sources 302 coordinate activities with the content provider 304 for the placement of the media content, such as providing metadata for the placement of interactive commercials.

Figure 3B:
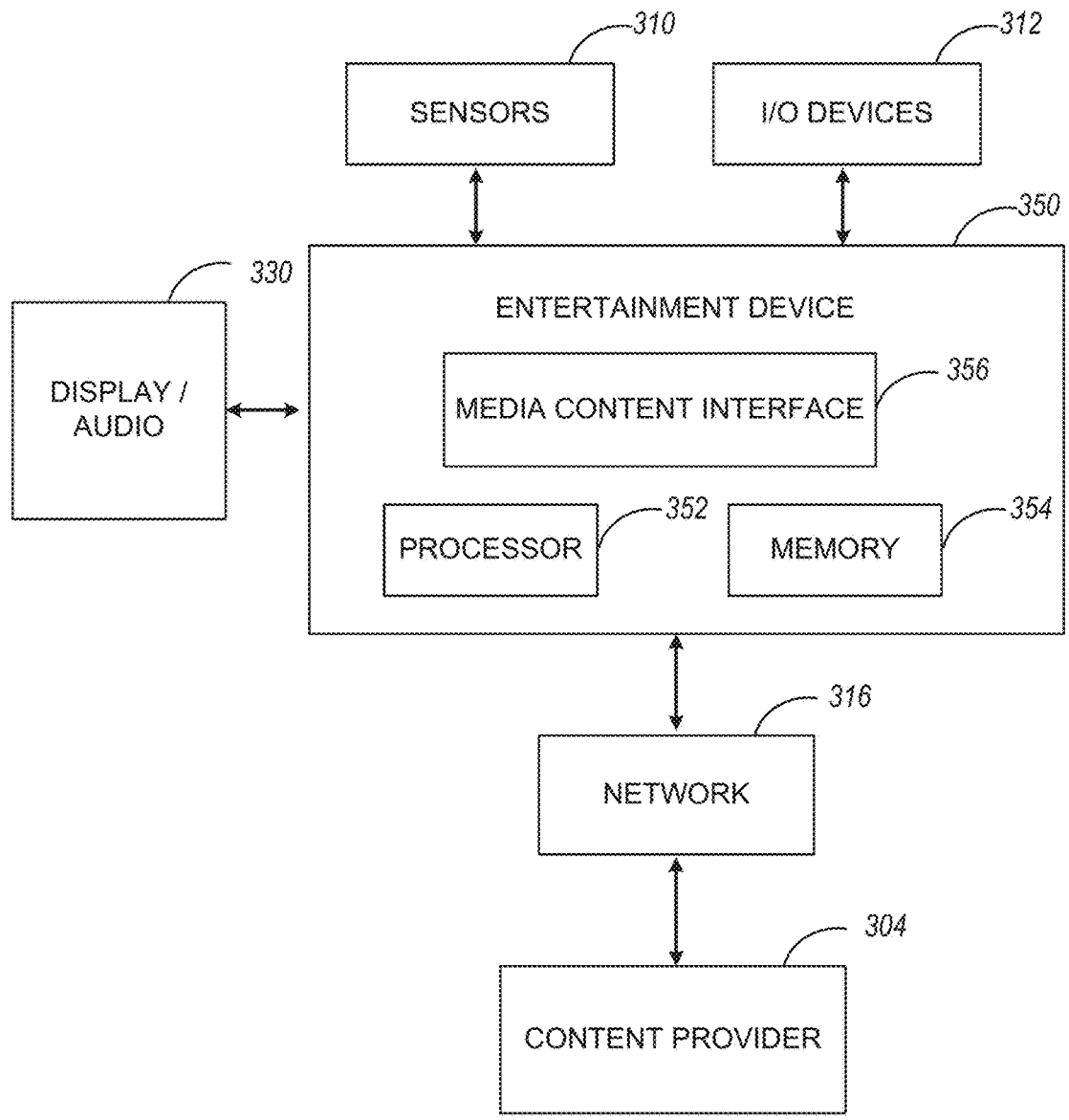
FIG. 3B illustrates a block diagram of an example infrastructure for generating post-engagement metadata.

FIG. 3B illustrates a block diagram of an example infrastructure 300B for generating post-engagement metadata, according to one implementation of the invention. As shown, the infrastructure 300 includes a content provider 304 and an entertainment device 350, each connected to a network 316.

In an example implementation, one or more entertainment devices 310 are located in each residential home or small business, while the content provider 304 exists across one or more data centers. A data center is a facility used to house computer systems and associated components, such as powerful data processing, telecommunications, and storage systems.

The entertainment device 350 connects to the content provider 304 through the network 301 via one or more Internet Service Providers (ISPs). An ISP is an organization that provides services for accessing and using the Internet. Internet Service Providers may be organized in various forms, such as commercial, community-owned, non-profit, or otherwise privately owned. Internet services typically provided by ISPs include Internet access, Internet transit, domain name registration, web hosting, Usenet service, and colocation. Each ISP typically serves large groups of Internet users in a geographic area.

The entertainment device 350 communicates with the content provider 304 over the network 316 to obtain media content (e.g., movies, videos, music, games, social applications, etc.). The entertainment device 350 includes at least a processor 352 and a memory 354 for storing data. In this particular example, the entertainment device 350 represents a processing device running a media content interface 356.

The media content interface 316 is configured to obtain media content from the content provider 304, to be rendered on a display 330 (e.g., a tablet, a smartphone, a monitor, a television, and/or a head-mounted display (HMD) for virtual reality (VR) or augmented reality (AR). The display 330 can additionally or alternatively include an audio output device such as a multimedia sound system or integrated speakers for outputting audio content.

The entertainment device 350 represents a set-top device connected to both the network 316 and the display 330 (e.g., a flat-panel television). Accordingly, entertainment device 350 is representative of digital cable boxes, digital video recorder (DVR) systems, video game consoles, and other media devices capable of connecting to a network 316 and receiving and playing back media streams provided by content provider 304. In such a case, the disc player could connect to the content provider 304 and download interface components used to select and playback media streams. Further, the display 330 may itself be an integrated device capable of connecting to the network 316 playing back media streams supplied by the content provider 304. For example, some television displays include integrated components used to connect to a streaming media service, video on demand services, or video sharing websites.

One or more input/output (I/O) devices 312 are connected (e.g., via wired cable or wireless connection such as WiFi or BLUETOOTH®) to or integrate into the he entertainment device 350.

One or more sensors 310 are connected to or integrate into the entertainment device 350. The sensor data is interpreted by the entertainment device 350 and/or the content provider 314.

Although only one entertainment device is shown in FIG. 3, in some implementations, the content provider 304 may serve a large number of entertainment devices 310. The content provider 304 provides a computing system configured to transmit media content to the entertainment device 350 (as well as other entertainment devices not shown). For example, content provider 304 may include a web-server, database, and/or application server configured to respond to requests for web pages and/or streaming media files received from the entertainment device 350. The media content itself may be distributed from the content provider 304 or through broader content distribution networks.

For example, in some implementations, the content provider 304 may allow users to authenticate themselves to the content provider 304 (e.g., using a username and password or using voice, fingerprint, or facial recognition). Once a given user is authenticated, the user may receive suggestions for activities from the content provider 304. The entertainment device 350 and/or content provider 304 may use relationships between user activities to generate a set of suggested activities and serve the set of activities to the user via the display 330. The entertainment device 350 downloads from the content provider 304 and plays one of the suggested activities. In addition to generating the set of suggested activities, the content provider 304 may also use relationships and between user activities and activity history of the user to generate other user activity suggestions and recommendations, to present on the entertainment device 350. The disclosure below in reference to FIG. 3 describes in more detail the generation of suggested actions for users of the home entertainment device 350.

The content provider 304 can include any computing or processing device, such as for example, one or more computer servers. The content provider 304 can be a single device, multiple devices in one location, or multiple devices in multiple locations. The disclosure below in reference to FIG. 5 describes in more detail example content provider configurations.

Figure 4A:
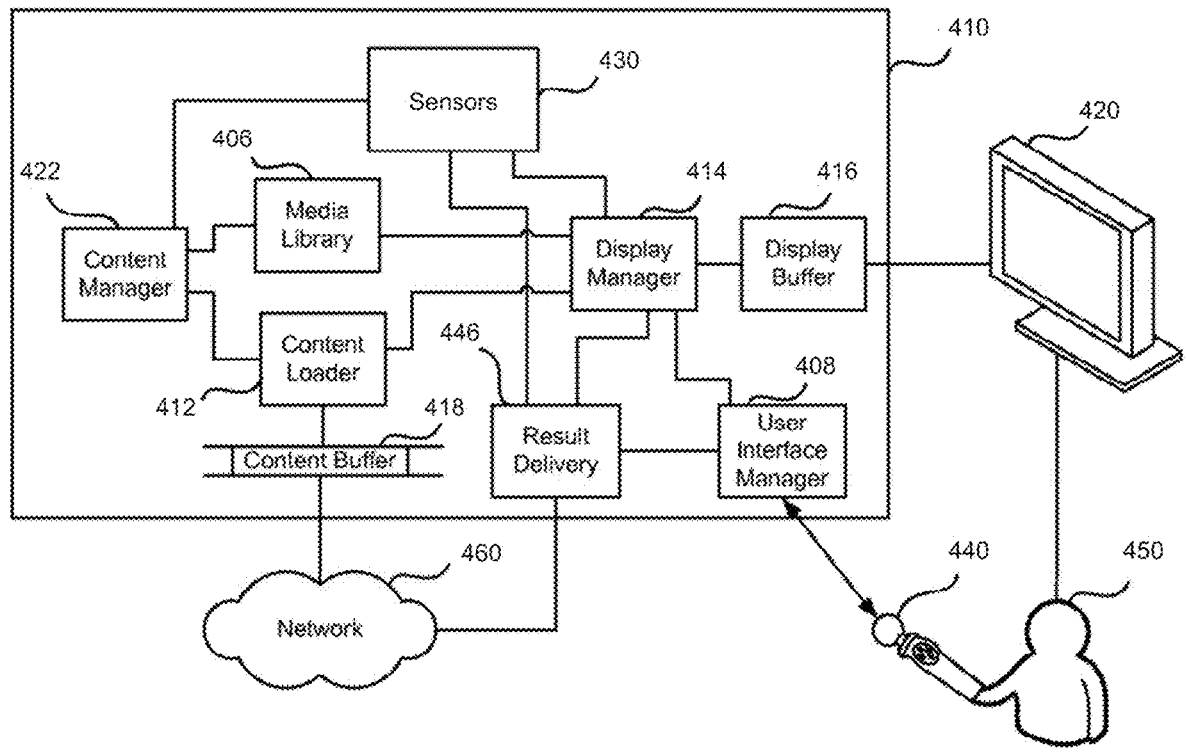
FIG. 4A illustrates example usage of an entertainment device for generating post-engagement metadata.

FIG. 4A illustrates example usage of an entertainment device 410 for generating post-engagement metadata. As shown, at least one user 450 is able to view a television display 420. The entertainment device 410 is connected to the television display 420 and one or more sensors 430. In some implementations, the entertainment device 410 is connected to a network 460 such as a wide area network (WAN) such as the Internet, or a local area network (LAN). The entertainment device 410 can also be used "offline" without connecting to the network 460.

The sensors 430 allow the entertainment device 410 to automatically determines how many people are in the area, whether they are registered users, and their user identities. In this case, entertainment device 410 determines that the user 450 is in the area.

Content manager 422 determines how to retrieve content for the user. In one embodiment, the content can be obtained from an internal media library 406, or from the Internet via Content loader 412. Content loader 412 downloads multimedia content via network 460, which is buffered by content buffer 418. Content loader 412 can retrieve content for storage in the media library 406 for later retrieval by the user. Display manager 414 receives the media from the media library and outputs the media into the display buffer 416, which drives display 422.

It is noted that the television display 420 is merely one example of multiple display device options for use with the present disclosure. Other display options include a monitor, television, tablet, or smartphone with a liquid crystal display (LCD), light-emitting diode (LED), or organic light-emitting diode (OLED) panel, etc. In some implementations, an audio output device (e.g., speakers) can be used in addition to the display 420 or in alternative to the display 420 to play audio media content for the user 450.

Figure 4B:
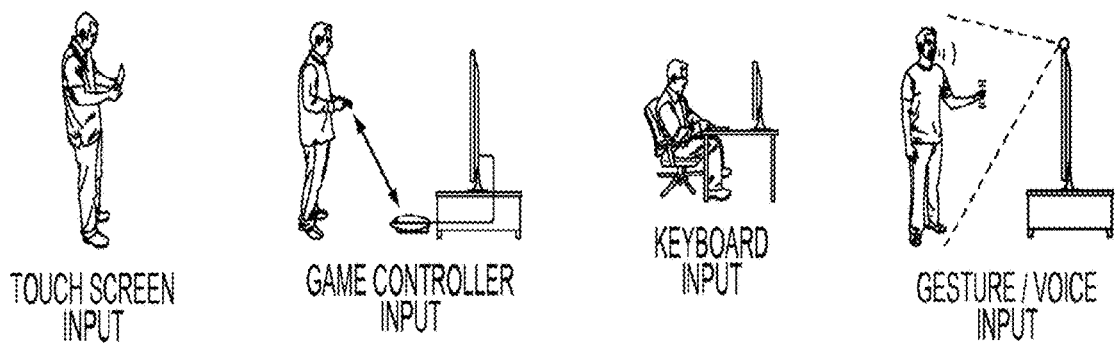
FIG. 4B illustrates example usage of various input devices with an entertainment device.

User interface manager 408 receives input from user 450 which can come from a variety of devices, such as single-handed controller 440, or other devices such as a two-hand controller, a mobile phone, a remote control, a keyboard, etc., as shown in FIG. 4B. The user input is communicated to the display manager 414 for further processing and updating of the video sent to display buffer 416. The user input may also be communicated to result delivery module 426 for transmission over the network 460.

FIG. 4B illustrates example usage of various input devices with an entertainment device for generating post-engagement metadata. The user 450 may command the entertainment device 410 to search for or suggest media content. For example, the user 450 may command the entertainment device 410 using an input device 440. In some implementations, the input device 440 may be a remote controller, a game controller, a joystick, a mouse, a keyboard, a touchscreen, a trackpad, or other similar control device. For example, the user 450 may command the entertainment device 410 using the input device 440 to play a recently released feature film. In some implementations, the entertainment device 410 can use the sensors 430 to receive voice or gesture commands from the user 450.

Figure 5:
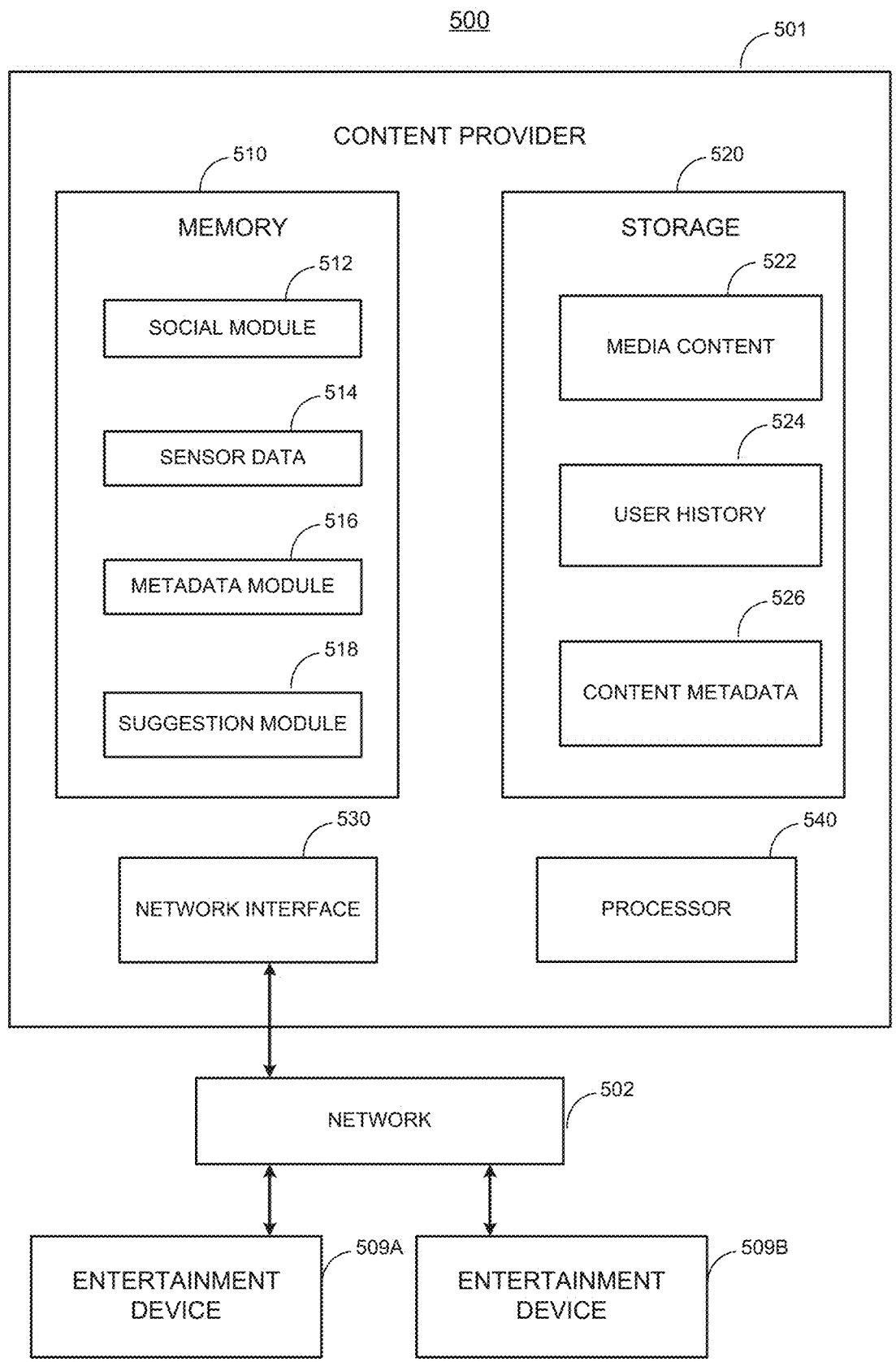
FIG. 5 illustrates a block diagram of an example content provider for generating post-engagement metadata.

FIG. 5 illustrates a block diagram 500 of an example content provider 501 for generating post-engagement metadata. As shown, the content provider 501 includes a processor 540, a network interface 530, a memory 510, and a storage 520. The content provider 501 connects to multiple entertainment devices 509A, 509B over a network 502.

Storage 530 includes media content 522, a user history 524, and content metadata 526. Media content 522 includes a library of media content available for download or streaming by an entertainment device 509. Accordingly, the media content 522 may include a collection of audio/video/game data encoded at various bitrates and stored on the content provider 501.

The user history 524 is representative of one or more log entries which store user/session data, including data relating to activities undertaken by various users of a number of entertainment devices 509. Such activities may include, e.g., playing a video game title, listening to a music track, viewing a media content, performing a search, viewing links, etc. The log entries may include, for example, a user identification (ID), media content played by the user, a timestamp of when the play started, and a timestamp of when the play ended. The log entries may include text of a search query entered by the user, and a timestamp of when the search query was received. The user history 524 may include user IDs of each user subscribing to the streaming media service, and may also include usernames, password data, user preferences and settings, and other user information.

The content metadata 526 in the storage 520 may include media content rollups, whether media content are available at various times, and other information relating to media content. For example, content metadata for videos may include automatically collected video metadata from software or a device such as a video camera. The metadata stores camera-created information such as aperture, shutter speed, GPS coordinates and more in the video file. The standard format is Exchangeable Information File Format (EXIF). Manually written video metadata provides additional information about the video content. Manual metadata can include transcripts of dialogue or conversations and other text descriptions. Such text entries are readable by computers and provide efficient searching.

The memory 510 can include any physical device used to temporarily or permanently store data or programs, such as various forms of random-access memory (RAM). The memory 510 stores various data and applications for quick access by the processor 540. The memory 510 stores a social module 512, sensor data 514, a metadata module 516, and a suggestion module 518.

The social module 512 is an application that determines possible social interactions for users of different entertainment device 509s. In some implementations, the social module 512 analyzes calendar schedules, historical activity, preferences, and interests for a group of users to determine possible social activities between the group of users. The group of users may be friends or acquaintances on a social network. The group of users may also be strangers and have no prior social interactions. The social module 512 may predict which group of users may have the best probability of compatibility and therefore have increased engagement with their entertainment device 509s. For example, the social module 512 may determine that two specific users are friends on a social network and both enjoy playing first person shooter games on weeknights, and therefore group those two specific users together.

The sensor data 514 is received from the entertainment device 509 over the network 502. Sensors connected to the entertainment device 509 provide various sensor data to the entertainment device 501 and/or to the content provider 501. For example, the sensor data 514 from a camera or microphone can allow the content provider 501 to determine how many people are in a room and their identities.

The sensor data 514 is interpreted by the entertainment device 509 and/or the content provider 501. Because the entertainment device 509 may have much lower processing power than the content provider 501, computationally intensive sensor data interpretation may occur at the content provider 501. In some implementations, the entertainment device 509 may perform rudimentary data interpretation locally, but send the sensor data for complex processing to the content provider 501 over the network 502.

The metadata module 516 is an application that generates metadata for users of each entertainment device 509A, 509B. In some implementations, the metadata module 516 is also or alternatively included in each entertainment device 509A, 509B. The metadata module 516 not only generates metadata when a user is engaging with the entertainment device 509, but also continues to generate metadata after the user stops engaging. The generated metadata can be stored in the storage 520 as content metadata 528.

For example, the metadata module 516 can generate metadata based on the user history 524. The metadata can include user/session data, including data relating to activities undertaken by various users of a number of entertainment devices 509, such as for example, which games were played, which videos were watched, and/or which music tracks were listened to, and a time and duration for each.

The metadata module 516 also generates metadata (i.e., post-engagement metadata) after the user stops engaging with the entertainment device 509. In some implementations, the metadata module 516 can monitor for when the user terminates engagement with the entertainment device 509 and record the last engagement activity. For example, the user may stop playing a first person shooter game on the entertainment device 509 after a streak of game losses. A record of the first person shooter game and the losing streak can be stored as post-engagement metadata related to the user.

In some implementations, the metadata module 516 determines post-engagement user actions using sensor data from at least one sensor. For example, post-engagement actions by the user can include going to bed, eating dinner, leaving the house to socialize, going to work, etc. The metadata module 516 then analyzes the sensor data to determine a termination cause, based on the post-engagement user actions. The metadata module 516 generates the post-engagement metadata which stores the termination cause. The generation of the post-engagement metadata by the metadata module 516 is described in more detail below in reference to FIG. 5.

The suggestion module 518 is an application that analyzes the social interactions from the social module 512, the sensor data 514, the user history 524, and the post-engagement metadata from the metadata module 516 to determine one or more suggested activities for continued user engagement with the entertainment device 509.

For example, a user may stop using the entertainment device 509 because the user's parents are asking the user to finish school work. The metadata module 516 may determine from sensor data from a microphone the cause of the user's termination of engagement with the entertainment device 509. The suggestion module 518 may then suggest an educational tutorial video to the user to encourage continued engagement with the entertainment device 509.

In some implementations, the suggestion module 518 suggests engaging watching/playing the suggest media content with an online remote user 509B connected over a network. For example, the online remote user can be an individual from a list of friends on a social network of one of the users of the entertainment device 509. The online remote user may be chosen based on similar interests and/or schedules.

Figure 6:
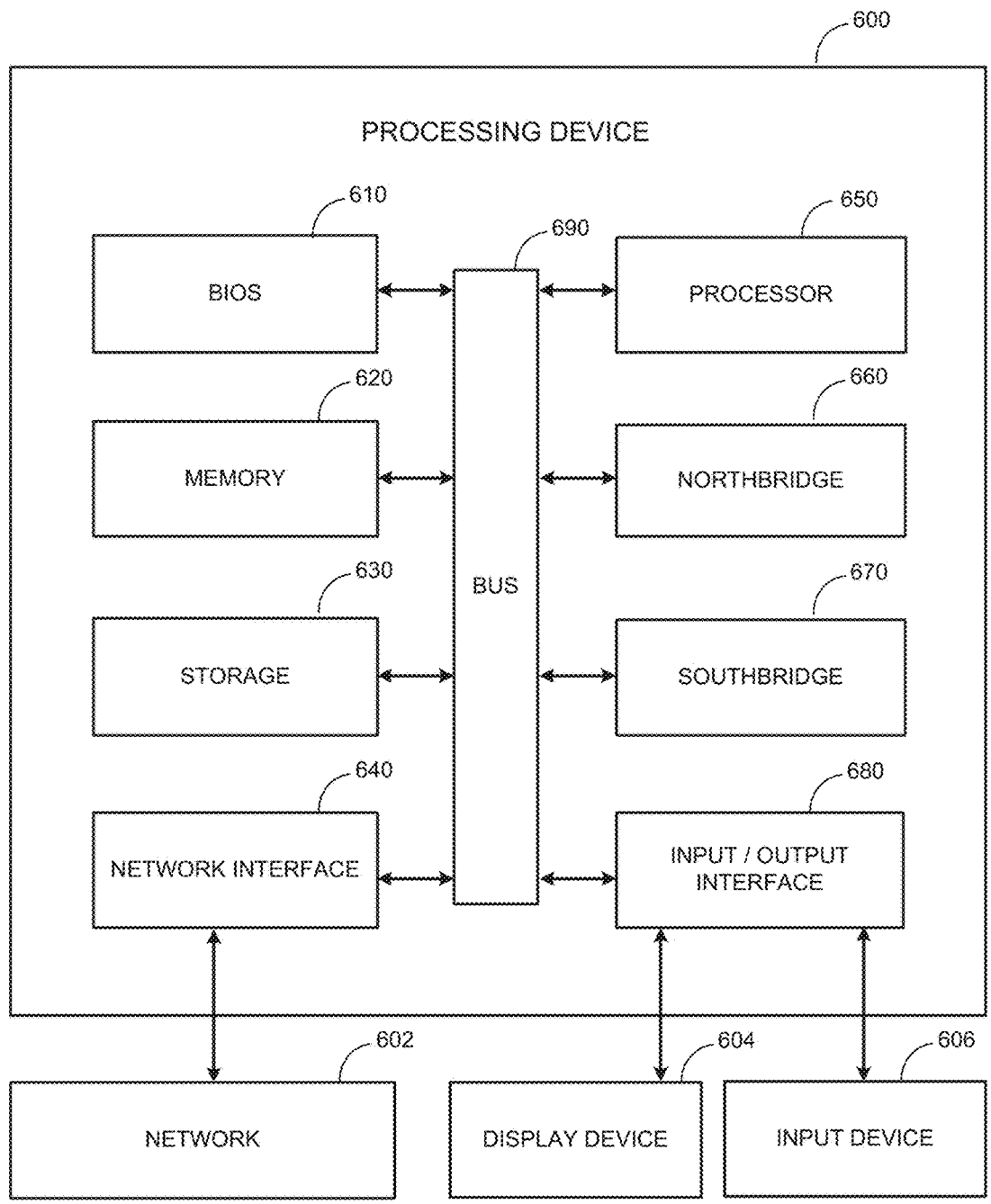
FIG. 6 illustrates a block diagram of an example processing device.

FIG. 6 illustrates a block diagram of an example processing device 600. The processing device 600 can include a Basic Input/Output System (BIOS) 610, a memory 620, a storage 630, a network interface 640, a processor 650, a northbridge 660, a southbridge 670, and an input/output (10) interface 680.

The processing device 600 can be any apparatus for processing data, such as for example, a server computer (e.g., one of many rack servers in a data center), a personal computer, a laptop computer, a smartphone, a tablet, an entertainment console, a wearable device, or a set top box. The processor (e.g., central processing unit (CPU)) 650 can be a chip on a motherboard that can retrieve and execute programming instructions stored in the memory 620. The processor 650 can be a single CPU with a single processing core, a single CPU with multiple processing cores, or multiple CPUs. One or more buses 690 can transmit instructions and application data between various computer components such as the processor 650, memory 620, storage 630, and networking interface 640.

The memory 620 can include any physical device used to temporarily or permanently store data or programs, such as various forms of random-access memory (RAM). The storage 630 can include any physical device for non-volatile data storage such as a HDD or a flash drive. The storage 630 can often have greater capacity than the memory 620 and can be more economical per unit of storage, but can also have slower data transfer rates.

The BIOS 610 can include a Basic Input/Output System or its successors or equivalents, such as an Extensible Firmware Interface (EFI) or Unified Extensible Firmware Interface (UEFI). The BIOS 610 can include a BIOS chip located on a motherboard of the processing device 600 storing a BIOS software program. The BIOS 610 can store firmware executed when the computer system is first powered on along with a set of configurations specified for the BIOS 610. The BIOS firmware and BIOS configurations can be stored in a non-volatile memory (e.g., NVRAM) 612 or a ROM such as flash memory. Flash memory is a non-volatile computer storage medium that can be electronically erased and reprogrammed.

The BIOS 610 can be loaded and executed as a sequence program each time the processing device 600 is started. The BIOS 610 can recognize, initialize, and test hardware present in a given computing system based on the set of configurations. The BIOS 610 can perform self-test, such as a Power-on-Self-Test (POST), on the processing device 600. This self-test can test functionality of various hardware components such as hard disk drives, optical reading devices, cooling devices, memory modules, expansion cards and the like. The BIOS can address and allocate an area in the memory 620 in to store an operating system. The BIOS 610 can then give control of the computer system to the OS.

The BIOS 610 of the processing device 600 can include a BIOS configuration that defines how the BIOS 610 controls various hardware components in the processing device 600. The BIOS configuration can determine the order in which the various hardware components in the processing device 600 are started. The BIOS 610 can provide an interface (e.g., BIOS setup utility) that allows a variety of different parameters to be set, which can be different from parameters in a BIOS default configuration. For example, a user (e.g., an administrator) can use the BIOS 610 to specify clock and bus speeds, specify what peripherals are attached to the computer system, specify monitoring of health (e.g., fan speeds and CPU temperature limits), and specify a variety of other parameters that affect overall performance and power usage of the computer system.

The network interface 640 connects the processing device 600 to a network 602. The network interface 350 is configured to transmit data to and from the network 602. The network 602 can include a wide area network (WAN) such as the Internet, or a local area network (LAN). The network 602 can include an intranet, a storage area network (SAN), a personal area network (PAN), a metropolitan area network (MAN), a wireless local area network (WLAN), a virtual private network (VPN), a cellular or other mobile communication network, a wireless local area networking (WiFi) network, a BLUETOOTH® wireless technology connection, a near field communication (NFC) connection, any combination thereof, and any other appropriate architecture or system that facilitates the communication of signals, data, and/or messages.

The I/O interface 680 allows the processing device 600 to connect with I/O devices such as a keyboard, a mouse, a remote control, a controller, a microphone, a television, a head mounted display (HMD), and/or a monitor, etc.

The northbridge 660 can be a chip on the motherboard that can be directly connected to the processor 650 or can be integrated into the processor 650. In some instances, the northbridge 660 and the southbridge 670 can be combined into a single die. The northbridge 660 and the southbridge 670, manage communications between the processor 650 and other parts of the motherboard. The northbridge 660 can manage tasks that require higher performance than the southbridge 670. The northbridge 660 can manage communications between the processor 650, the memory 620, and video controllers (not shown). In some instances, the northbridge 660 can include a video controller.

The southbridge 670 can be a chip on the motherboard connected to the northbridge 660, but unlike the northbridge 660, is not directly connected to the processor 650. The southbridge 670 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the processing device 600. The southbridge 670 can be connected to or can include within the southbridge 670 the I/O interface 670, Direct Memory Access (DMAs) controllers, Programmable Interrupt Controllers (PICs), and a real-time dock.

One or more input devices 606 can connect to the processing device 600. The input device 606 can also be integrated into the processing device 600. The input device 606 can be at least one of a game controller, a joystick, a mouse, a keyboard, a touchscreen, a trackpad, or other similar control device. The input device 606 allows a user to provide input data to the processing device 600.

One or more display devices 604 can connect to the processing device 600. The display device 604 can also be integrated into the processing device 600. The display device 604 can be at least one of a monitor, a light-emitting display (LED) screen, a liquid crystal display (LCD) screen, a head mounted display (HMD), a virtual reality (VR) display, a augmented reality (AR) display, or other such output device. The display device 604 allows the processing device 600 to output visual information to a user.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A method for promoting user engagement with entertainment devices, the method comprising:
   receiving post-engagement metadata associated with a user that has terminated engagement with one or more content titles, wherein the post-engagement metadata indicates one or more user actions after the user terminated play of the content titles;
   determining one or more termination causes based on a type of the user actions indicated by the post-engagement metadata;
   identifying a set of one or more available engagement activities corresponding to one or more of the content titles, wherein identifying the set of engagement activities is based on the determined termination causes indicated by the post-engagement metadata; and
   presenting the identified set of engagement activities on an entertainment device of the user when the user is determined to be available for engagement.

2. The method of claim 1, wherein determining the termination causes is further based on a user history stored in memory, the user history including at least one of session data, log entries, user settings, user queries, and social messages.

3. The method of claim 1, further comprising generating the metadata based on engagement data from the entertainment device.

4. The method of claim 3, wherein generating the metadata comprises:
   receiving the engagement data captured by the entertainment device in association with the play of one of the content titles;
   identifying that the user has terminated engagement with the content title being played; and
   identifying a last engagement activity indicated by the engagement data before the user terminated engagement and the post-engagement activity.

5. The method of claim 1, further comprising generating the metadata based on sensor data captured by one or more sensors at a location of the user.

6. The method of claim 5, wherein generating the metadata comprises:
   receiving the sensor data from the one or more sensors, the sensor data captured in association with the play of one of the content titles on the entertainment device, wherein the user is detected as having terminated engagement with the content title being played; and
   identifying that the user has performed a post-engagement action based on the sensor data captured after the user is detected as having terminated engagement, wherein the metadata indicates the identified post-engagement action.

7. The method of claim 5, wherein the sensor data further indicates at least one of a number of other users at the location, one or more identities of the other users, one or more activities engaged in by the other users, and contents of conversations at the location.

8. The method of claim 1, further comprising generating the metadata based on data regarding social interaction by the user on one or more online networks.

9. The method of claim 1, further comprising:
   receiving a selection by the user from among the set of engagement activities presented on the entertainment device; and
   updating a user history stored in memory based on the received selection, wherein identifying a subsequent set of engagement activities to present to the user is based on the updated user history.

10. The method of claim 1, wherein at least one of the engagement activities presented to the user via the entertainment devices includes interaction with another user identified as being compatible with the user based on a comparison of respective user histories.

11. A system for promoting user engagement with entertainment devices, the system comprising:
    a communication interface that communicates over a communication network to receive post-engagement metadata associated with a user that has terminated engagement with one or more content titles, wherein the post-engagement metadata indicates one or more user actions after the user terminated play of the content titles;
    a processor that executes instructions stored in memory, wherein the processor executes the instructions to:
       determine one or more termination causes based on a type of the user actions indicated by the post-engagement metadata, and
       identify a set of one or more available engagement activities corresponding to one or more of the content titles, wherein identifying the set of engagement activities is based on the determined termination causes indicated by the post-engagement metadata;
    wherein the communication interface provides the identified set of engagement activities for presentation on an entertainment device of the user when the user is determined to be available for engagement.

12. The system of claim 11, further comprising memory that stores a user history that includes at least one of session data, log entries, user settings, user queries, and social messages; and wherein the processor determines the termination causes further based on the user history.

13. The system of claim 11, wherein the processor executes further instructions to generate the metadata based on engagement data from the entertainment device.

14. The system of claim 13, wherein the communication interface further receives the engagement data captured by the entertainment device in association with the play of one of the content titles, and wherein the processor generates the metadata by:
    identifying that the user has terminated engagement with the content title being played; and
    identifying a last engagement activity indicated by the engagement data before the user terminated engagement and the post-engagement activity.

15. The system of claim 11, wherein the processor executes further instructions to generate the metadata based on sensor data captured by one or more sensors at a location of the user.

16. The system of claim 15, wherein the communication interface further receives the sensor data from the one or more sensors, the sensor data captured in association with the play of one of the content titles on the entertain device, wherein the user is detected as having terminated engagement with the content title being played, wherein the processor generates the metadata by identifying that the user has performed a post-engagement action based on the sensor data captured after the user is detected as having terminated engagement, and wherein the metadata indicates the identified post-engagement action.

17. The system of claim 15, wherein the sensor data further indicates at least one of a number of other users at the location, one or more identities of the other users, one or more activities engaged in by the other users, and contents of conversations at the location.

18. The system of claim 11, wherein the processor executes further instructions to generate the metadata based on data regarding social interaction by the user on one or more online networks.

19. The system of claim 11, wherein the communication network further receives a selection by the user from among the set of engagement activities presented on the entertainment device; and further comprising memory that updates a user history based on the received selection, wherein the processor identifies a subsequent set of engagement activities to present to the user is based on the updated user history.

20. The system of claim 11, wherein at least one of the engagement activities presented to the user via the entertainment devices includes interaction with another user identified as being compatible with the user based on a comparison of respective user histories.

21. A non-transitory computer-readable storage medium having embodied thereon a program executable by a processor to perform a method for encouraging continued engagement with an entertainment device, the method comprising:

receiving post-engagement metadata associated with a user that has terminated engagement with one or more content titles, wherein the post-engagement metadata indicates one or more user actions after the user terminated play of the content titles;

determining one or more termination causes based on a type of the user actions indicated by the post-engagement metadata;

identifying a set of one or more available engagement activities corresponding to one or more of the content titles, wherein identifying the set of engagement activities is based on the determined termination causes indicated by the post-engagement metadata; and presenting the identified set of engagement activities on the entertainment device of the user when the user is determined to be available for engagement.

* * * * *